(12) United States Patent
Du et al.

(10) Patent No.: US 10,353,468 B2
(45) Date of Patent: Jul. 16, 2019

(54) TACTILE FEEDBACK METHOD AND APPARATUS, AND VIRTUAL REALITY INTERACTIVE SYSTEM

(71) Applicant: Beijing Zhigu Rui Tuo Tech Co., Ltd., Beijing (CN)

(72) Inventors: Lin Du, Beijing (CN); Liang Zhou, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 12 days.

(21) Appl. No.: 15/356,324

(22) Filed: Nov. 18, 2016

(65) Prior Publication Data
US 2017/0160805 A1    Jun. 8, 2017

(30) Foreign Application Priority Data

Dec. 4, 2015  (CN) .......................... 2015 1 0885253

(51) Int. Cl.
*G06F 3/01* (2006.01)
*G06F 1/3231* (2019.01)
*G06F 1/3234* (2019.01)

(52) U.S. Cl.
CPC .............. *G06F 3/016* (2013.01); *G06F 1/325* (2013.01); *G06F 1/3231* (2013.01); *G06F 1/3259* (2013.01); *G06F 3/011* (2013.01); *Y02D 10/155* (2018.01); *Y02D 10/173* (2018.01)

(58) Field of Classification Search
CPC . G06T 19/006; G06T 19/003; G06T 2215/16; G06T 15/00; G06F 3/011; G06F 3/033; G06F 3/016; G06F 2203/013; G06F 2203/014; G06F 2203/04809; G06F 2203/015; G02B 27/017; A63F 13/06;
(Continued)

(56) References Cited

U.S. PATENT DOCUMENTS

2009/0167701 A1  7/2009 Ronkainen
2010/0231540 A1* 9/2010 Cruz-Hernandez ..... G06F 3/016
                                                    345/173
2011/0279250 A1  11/2011 Ryhanen et al.
(Continued)

FOREIGN PATENT DOCUMENTS

CN    101809526 A    8/2010
CN    101910977 A    12/2010
(Continued)

*Primary Examiner* — Koosha Sharifi-Tafreshi
(74) *Attorney, Agent, or Firm* — Sheppard Mullin Richter & Hampton LLP

(57) ABSTRACT

The present application provides a tactile feedback method, comprising: determining, on a virtual reality (VR) interactive controller, a region where contact between a user and the VR interactive controller occurs; and generating, according to relevant information of an object simulated by the VR interactive controller, at least a first contact feedback in the region where the contact occurs. The present application also provides a tactile feedback apparatus and a VR interactive system. The technical solutions provided by embodiments of the present application are used to cause that it is unnecessary to provide a tactile feedback to a user on the entire VR interactive controller, thereby greatly reducing energy consumption needed for generating a tactile feedback.

10 Claims, 10 Drawing Sheets

(58) Field of Classification Search
CPC ...... A63F 13/24; A63F 13/285; A61B 5/7455;
B60W 50/16
See application file for complete search history.

(56) References Cited

U.S. PATENT DOCUMENTS

| | | |
|---|---|---|
| 2012/0081326 A1 | 4/2012 | Heubel et al. |
| 2012/0122575 A1* | 5/2012 | Barney ................ A63F 13/428 463/31 |
| 2013/0335454 A1 | 12/2013 | Birnbaum et al. |
| 2014/0340338 A1* | 11/2014 | Kim ...................... G06F 3/0488 345/173 |
| 2016/0274662 A1* | 9/2016 | Rimon .................... G06F 3/014 |
| 2017/0361217 A1* | 12/2017 | Burdea ................... A63F 13/06 |
| 2018/0059819 A1* | 3/2018 | Moseley ................. G06F 3/046 |
| 2018/0067545 A1* | 3/2018 | Provancher ............ G06F 3/011 |
| 2018/0203509 A1* | 7/2018 | Yamano ................. G06F 3/016 |

FOREIGN PATENT DOCUMENTS

| | | |
|---|---|---|
| CN | 102893241 A | 1/2013 |
| CN | 103488298 A | 1/2014 |
| CN | 103577043 A | 2/2014 |

* cited by examiner

TACTILE FEEDBACK METHOD AND APPARATUS, AND VIRTUAL REALITY INTERACTIVE SYSTEM

CROSS REFERENCE TO RELATED APPLICATION

The present application is based on and claims the benefit of priority to Chinese Application No. 201510885253.6, filed on Dec. 4, 2015, the entire contents of which are incorporated herein by reference.

TECHNICAL FIELD

The present application relates to the field of man-machine interactions, and in particular, to a tactile feedback method and apparatus, and a virtual reality interactive system.

BACKGROUND

The virtual reality (VR) technology is an important direction of simulation technologies, and enables, by means of perceptive stimulation in multiple dimensions such as visual sense, hearing, tactility, and smell sense, a user to enter a virtual world different from a physical environment where the user is located. Ideal VR should possess all perceptive functions possessed by a person.

In a VR system, if a person sees a cup and intends to pick it up, however, because the cup is virtual, a hand of the person does not have a feeling of really touching the cup, but "passes through" the virtual cup.

In a conventional solution, to enable people to more appropriately feel a feeling similar to the foregoing feeling of touching the cup, generally, some vibratile contacts are mounted on a VR interactive controller (such as a glove, a joystick, or a handheld controller) to implement a tactile feedback.

However, such a conventional solution generally provides a tactile feedback on the entire VR interactive controller, which causes relatively high energy consumption.

SUMMARY

An objective of the present application is to provide a tactile feedback method and apparatus, and a VR interactive system.

According to a first aspect of at least one embodiment of the present application, a tactile feedback method is provided, which comprises:

determining, on a virtual reality (VR) interactive controller, a region where contact between a user and the VR interactive controller occurs; and generating, according to relevant information of an object simulated by the VR interactive controller, at least a first contact feedback in the region where the contact occurs.

According to a second aspect of at least one embodiment of the present application, a tactile feedback apparatus is provided, which comprises:

a contact determining module, configured to determine, on a virtual reality (VR) interactive controller, a region where contact between a user and the VR interactive controller occurs; and a tactile feedback module, configured to generate, according to relevant information of an object simulated by the VR interactive controller, at least a first contact feedback in the region where the contact occurs.

According to a third aspect of at least one embodiment of the present application, a VR interactive system is provided, which comprises a memory, a processor, and a VR interactive controller, wherein the memory is configured to store an instruction; and the processor is configured to execute the instruction to execute the following steps:

determining, on the VR interactive controller, a region where contact between a user and the VR interactive controller occurs; and generating, according to relevant information of an object simulated by the VR interactive controller, at least a first contact feedback in the region where the contact occurs.

With regard to the tactile feedback method and apparatus, and the VR interactive system in embodiments of the present application, at least a first contact feedback is generated, according to relevant information of an object simulated by the VR interactive controller, in a region where contact between a user and the VR interactive controller occurs. Therefore, it is unnecessary to provide a tactile feedback to a user on the entire VR interactive controller, thereby greatly reducing energy consumption needed for generating a tactile feedback.

DETAILED DESCRIPTION

Specific implementations of the present application are further described in detail below with reference to the accompanying drawings and embodiments. The following embodiments are intended to describe the present application, but not to limit the scope of the present application.

It should be understood by a person skilled in the art that in embodiments of the present application, the value of the serial number of each step does not mean an execution sequence, and the execution sequence of each step should be determined according to the function and internal logic thereof, and should not be any limitation on the implementation procedure of the specific embodiments of the present application.

In addition, the terms "first", "second", and the like in the present application are merely used to distinguish different steps, devices, modules, or the like, and neither represent any special technical meaning, nor represent a necessary logical sequence therebetween.

Figure 1:
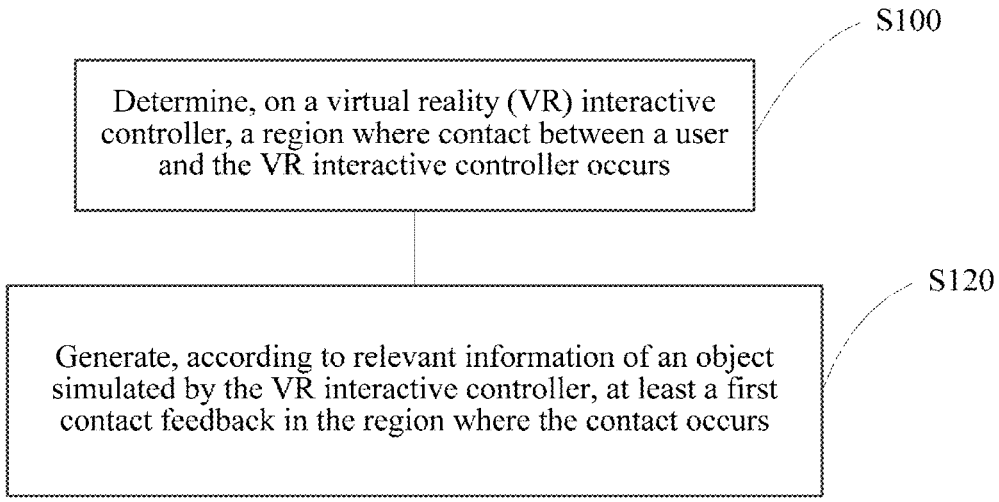
FIG. 1 is a flowchart of a tactile feedback method of an embodiment of the present application.

FIG. 1 is a flowchart of a tactile feedback method of an embodiment of the present application, and as shown in FIG. 1, the method may comprise:

S100: Determine, on a virtual reality (VR) interactive controller, a region where contact between a user and the VR interactive controller occurs.

S120: Generate, according to relevant information of an object simulated by the VR interactive controller, at least a first contact feedback in the region where the contact occurs.

The tactile feedback method of the embodiments of the present application is used, wherein at least a first contact feedback is generated, according to relevant information of an object simulated by the VR interactive controller, in a region where contact between a user and the VR interactive controller occurs. Therefore, it is unnecessary to provide a tactile feedback to a user on the entire VR interactive controller, thereby greatly reducing energy consumption needed for generating a tactile feedback.

Exemplarily, in the embodiments of the present application, the VR interactive controller may be hardware device provided for an interaction between a user and a virtual content and includes, but not limited to, a glove, a joystick, a handheld controller, or the like, which is not specifically defined in the embodiments of the present application.

Figure 2:
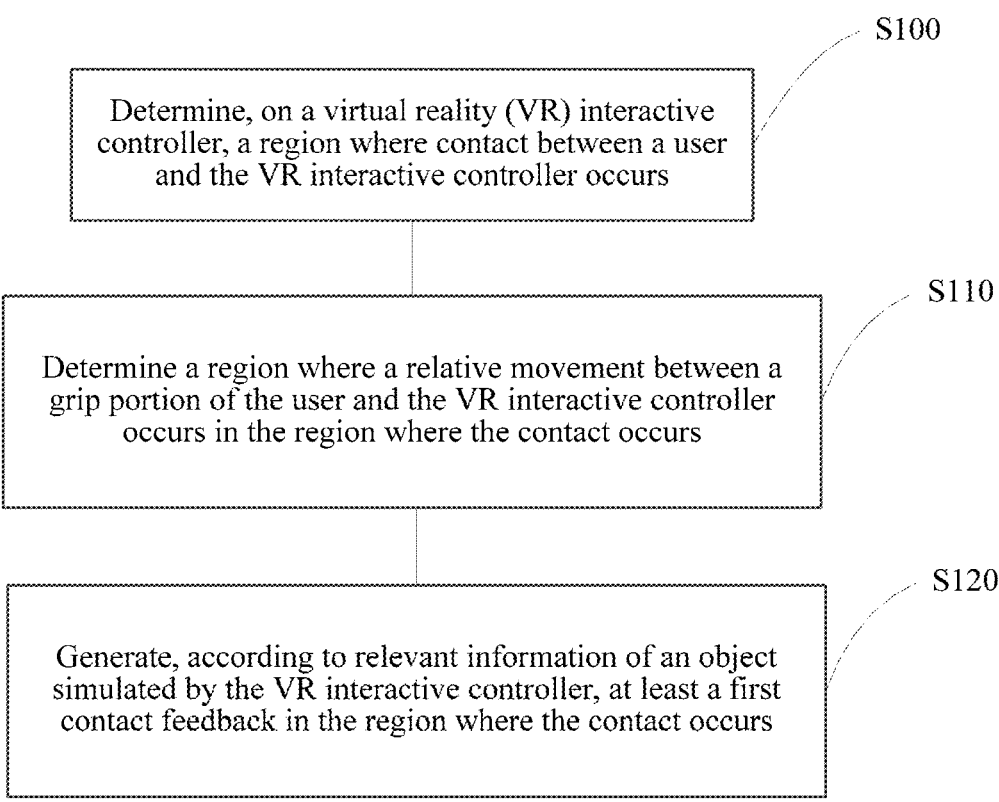
FIG. 2 is a flowchart of a tactile feedback method of another embodiment of the present application.

Optionally, as shown in FIG. 2, after the foregoing S100, the method may further comprise:

S110: Determine a region where a relative movement between a grip portion of the user and the VR interactive controller occurs in the region where the contact occurs.

In an optional implementation manner, a grip portion of the user may be a hand of the user, a foot of the user or another part for wearing or holding the VR interactive controller on the body of the user, which is not specifically defined in the embodiments of the present application. In the region where the relative movement occurs, a relative distance between the grip portion of the user and the VR interactive controller is not a constant within a specific time, that is, a change occurs. Exemplarily, a transverse movement of the grip portion of the user occurs on a surface of the VR interactive controller; or the grip portion of the user applies a force in a vertical direction on the surface of the VR interactive controller to cause deformation on the surface of the VR interactive controller, for example, the user presses the VR interactive controller with force to cause that the surface of the VR interactive controller concaves down by a specific distance.

Figure 3:
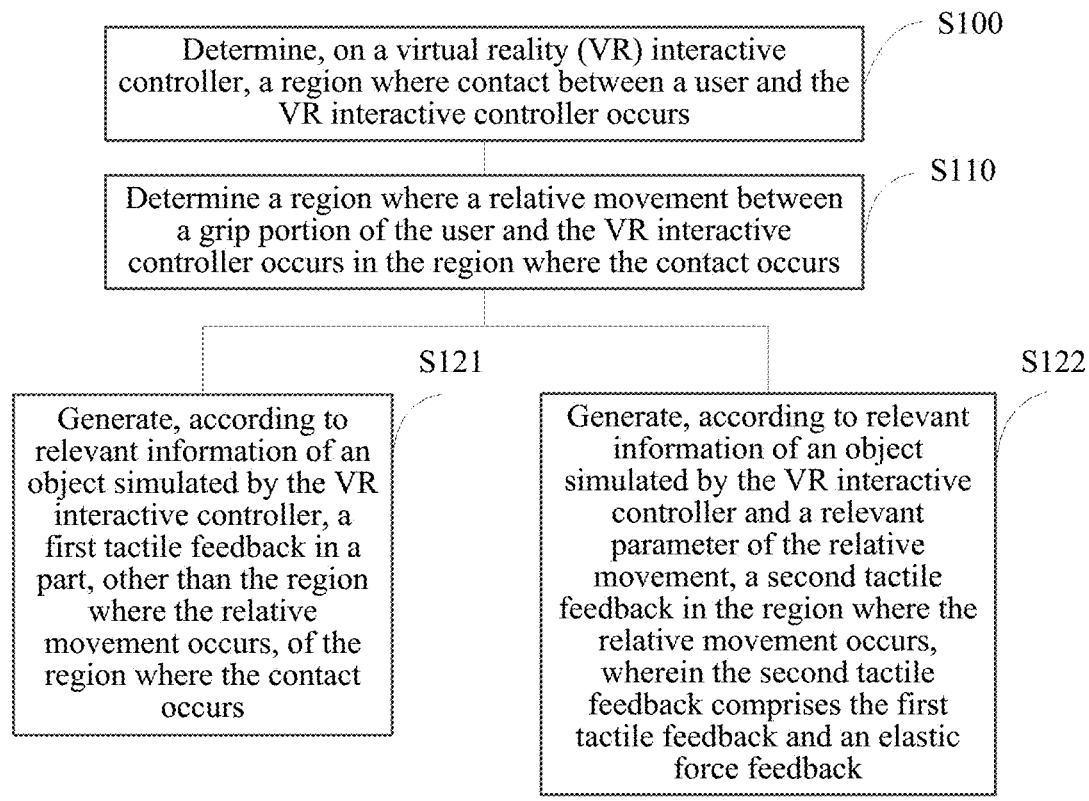
FIG. 3 is a flowchart of a tactile feedback method of another embodiment of the present application.

Optionally, as shown in FIG. 3, in another optional implementation manner of the present application, in S120, the generating, according to relevant information of an object simulated by the VR interactive controller, at least a first contact feedback in the region where the contact occurs may comprise:

S121: Generate, according to the relevant information of the object simulated by the VR interactive controller, the first tactile feedback in the part, other than the region where the relative movement occurs, of the region where the contact occurs.

Optionally, in an optional implementation manner of the present application, the relevant information of the foregoing object simulated by the VR interactive controller may comprise: attribute information of the foregoing object simulated by the VR interactive controller, for example, the object simulated is what device, is suitable for which gripping manner, has what shape and thickness, is made of which material, is new or old, and has what pattern on the surface, and the like, which is not specifically defined in the embodiments of the present application.

S122: Generate, according to the relevant information of the object simulated by the VR interactive controller and a relevant parameter of the relative movement, a second tactile feedback in the region where the relative movement occurs, wherein the second tactile feedback comprises the first tactile feedback and an elastic force feedback.

Optionally, in an optional implementation manner of the present application, the parameter of the foregoing relative movement may comprise: a changing amount of the relative distance between the grip portion of the user and the VR interactive controller, or the time when the relative distance between the grip portion of the user and the VR interactive controller changes, or the like, which is not specifically defined in the embodiments of the present application.

Because in the region where the relative movement occurs, an acting force and a reacting force are generated between the grip portion of the user and the VR interactive controller, in addition to the first tactile feedback, at least an elastic force feedback is provided.

Optionally, in an optional implementation manner of the present application, the foregoing first tactile feedback may comprise: a physical material feedback of the object simulated by the VR interactive controller and/or a texture feedback of the object simulated by the VR interactive controller. Exemplarily, the foregoing texture feedback may comprise a combination of one or more of the following feedbacks: a concave-convex feeling feedback and a sticky feeling feedback.

Figure 4:
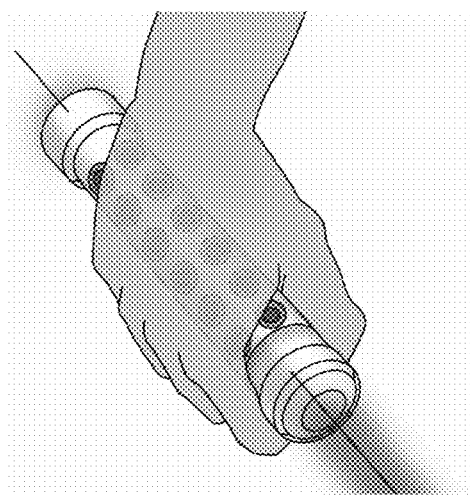
FIG. 4 is a schematic diagram of a specific implementation of a tactile feedback provided by an embodiment of the present application.

In a specific implementation, a tactile feedback sensor of the VR interactive controller in the region where the contact occurs may be activated or distribution of the tactile feedback sensor on the VR interactive controller may be adjusted, as shown in FIG. 4, so as to generate the foregoing first tactile feedback, for example:

(1) a surface temperature of the VR interactive controller in the region where the contact occurs is adjusted to generate a tactile feedback of a different physical material; alternatively (2) the elasticity of the VR interactive controller in the region where the contact occurs is adjusted to generate a tactile feedback of a different sticky feeling; alternatively (3) the slope or gradient modulation resistance of the VR interactive controller in the region where the contact occurs is adjusted to generate a tactile feedback of a different concave-convex feeling.

In another specific implementation, a tactile feedback sensor of the VR interactive controller in the region where the contact occurs may be activated or distribution of the tactile feedback sensor on the VR interactive controller may be adjusted, so as to generate the foregoing second tactile feedback, for example, the sliding resistance between skin and a conductive surface may be modulated by means of electrovibration to generate a different elastic force feedback (rubbery sensation).

Figure 5:
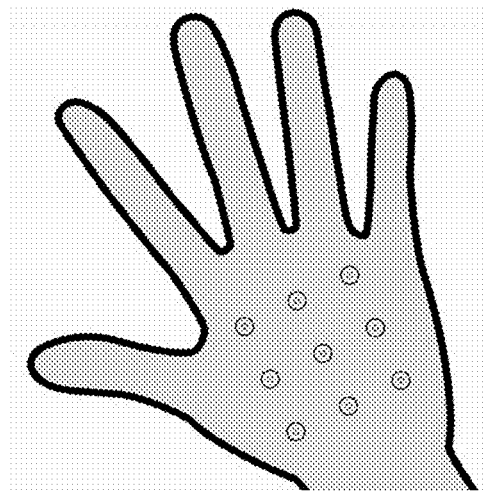
FIG. 5 is a schematic diagram of a specific implementation of another tactile feedback provided by an embodiment of the present application.

In still another specific implementation, an external signal can be received, which, for example, may be an ultrasound or compressed air signal generated by at least one tactile feedback sensor distributed in the space. By means of a field effect generated by the external signal, the foregoing first tactile feedback and/or the foregoing second tactile feedback is generated on the grip portion of the user, as shown in FIG. 5.

Figure 6A:
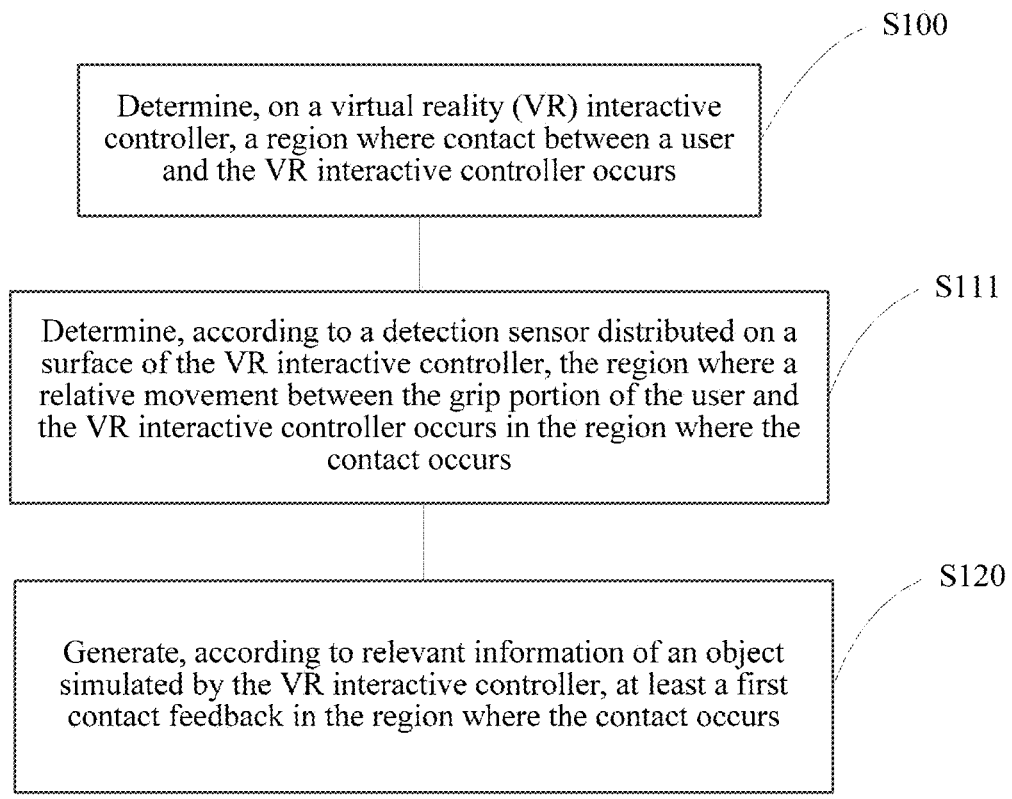
FIG. 6a is a flowchart of a tactile feedback method of another embodiment of the present application.

Optionally, as shown in FIG. 6a, in another optional implementation manner of the present application, in S110, the determining a region where a relative movement between a grip portion of the user and the VR interactive controller occurs in the region where the contact occurs may comprise:

S111: Determine, according to a detection sensor distributed on a surface of the VR interactive controller, the region where the relative movement between the grip portion of the user and the VR interactive controller occurs in the region where the contact occurs.

Similarly, in S100 the region where the contact between the user and the VR interactive controller occurs may be determined, according to a detection sensor distributed on a surface of the VR interactive controller, on the virtual reality (VR) interactive controller.

Exemplarily, the foregoing detection sensor may be a pressure sensor, and a specific region of the VR interactive controller where the contact and/or relative movement between the grip portion of the user and the region occurs is determined by detecting a change of a sensed value of the pressure sensor.

Figure 6B:
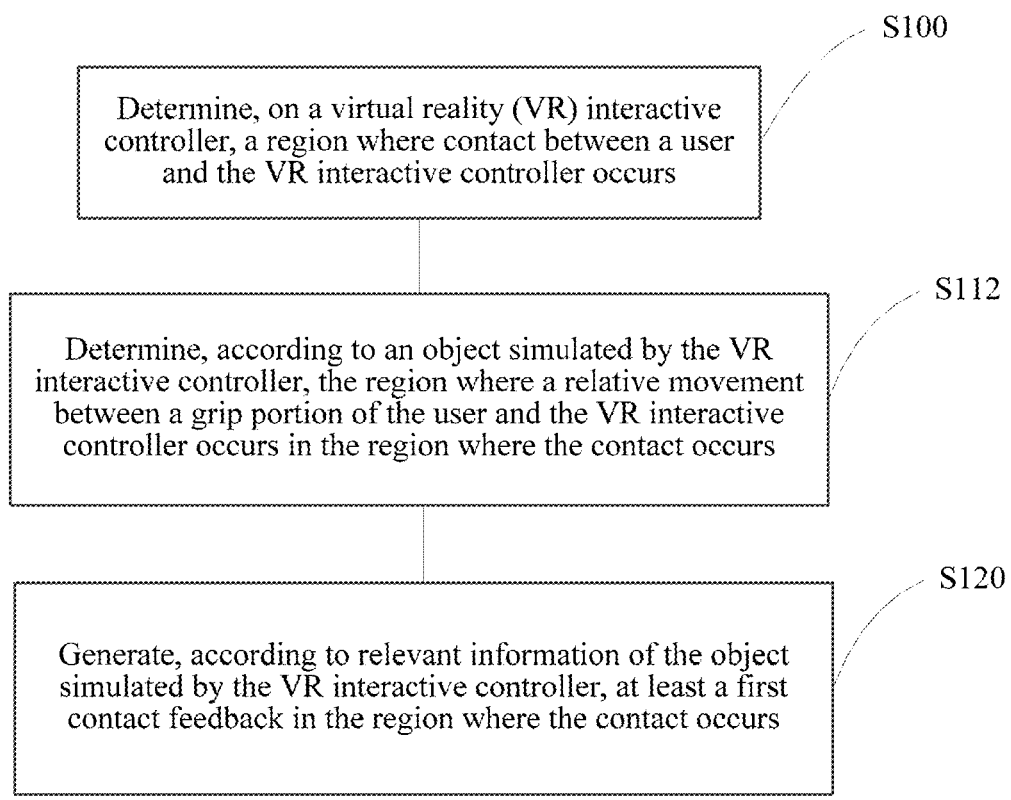
FIG. 6b is a flowchart of a tactile feedback method of another embodiment of the present application.

Optionally, as shown in FIG. 6b, in another optional implementation manner of the present application, in S110, the determining a region where a relative movement between a grip portion of the user and the VR interactive controller occurs in the region where the contact occurs may comprise:

S112: Determine, according to the object simulated by the VR interactive controller, the region where the relative movement between the grip portion of the user and the VR interactive controller occurs in the region where the contact occurs.

Exemplarily, an action to be performed by the grip portion of the user (for example, the left hand or right hand) after a preset time period may be determined according to the object simulated by the VR interactive controller and an ongoing virtual content plot; and after the preset time period has passed, the region where the relative movement between the grip portion of the user and the VR interactive controller occurs in the region where the contact occurs is determined according to the action to be performed by the grip portion of the user after the preset time period.

For example, if the object simulated by the VR interactive controller is a rifle, and the ongoing virtual content plot is that a game character is about to shoot a prey with the rifle, it could be determined that after a preset time segment has been passed, when the game character pulls the trigger, a relative movement would occur between a region, corresponding to the trigger of the rifle, on the VR interactive controller and a finger of the user.

Figure 6C:
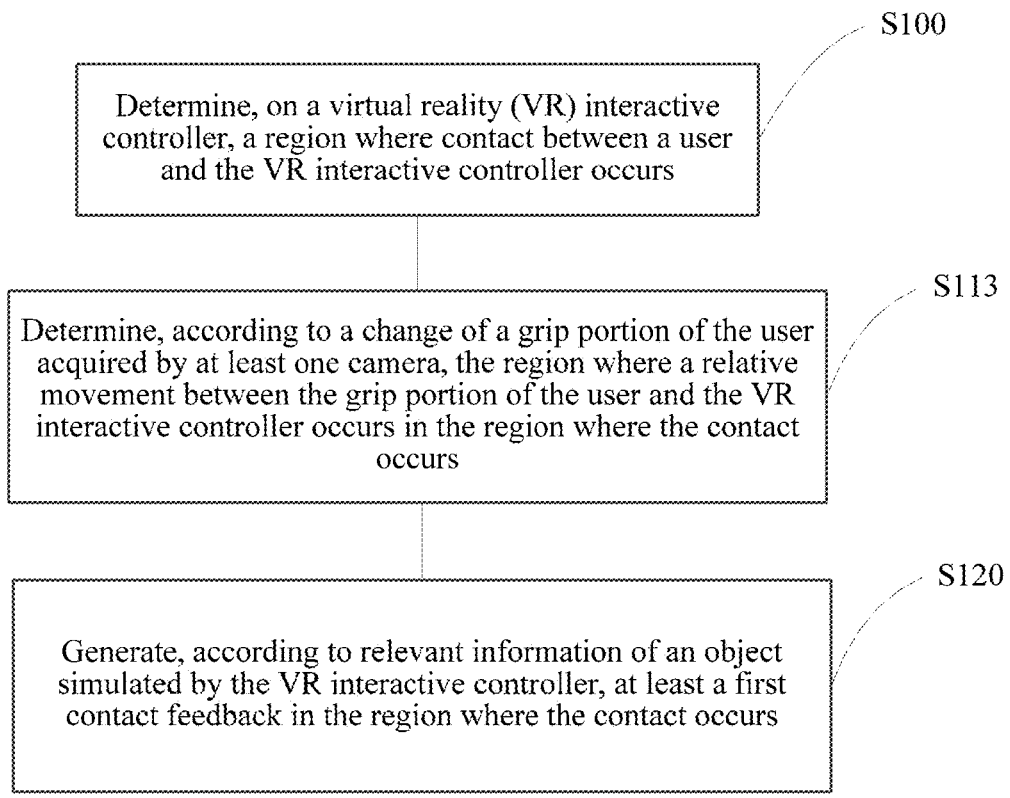
FIG. 6c is a flowchart of a tactile feedback method of another embodiment of the present application.

Optionally, as shown in FIG. 6c, in another optional implementation manner of the present application, in S110, the determining a region where a relative movement between a grip portion of the user and the VR interactive controller occurs in the region where the contact occurs may comprise:

S113: Determine, according to a change of the grip portion of the user acquired by at least one camera, the region where the relative movement between the grip portion of the user and the VR interactive controller occurs in the region where the contact occurs.

Figure 6D:
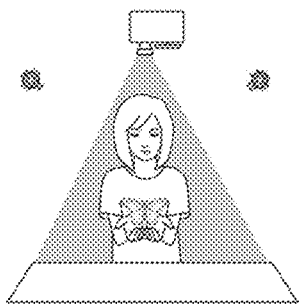
FIG. 6d is a schematic diagram of a specific implementation of determining a relative movement region in an embodiment of the present application.

Exemplarily, as shown in FIG. 6d, the user can be photographed by at least one camera distributed in the space, and a static picture or a moving image of the grip portion of the user collected by the at least one camera is analyzed; the change of the profile of the grip portion of the user is determined (for example, a 3D depth map of the grip portion of the user can be determined); and the region where the relative movement between the grip portion of the user and the VR interactive controller occurs is determined, according to the change of the profile of the grip portion of the user, in the region where the contact occurs.

Figure 7:
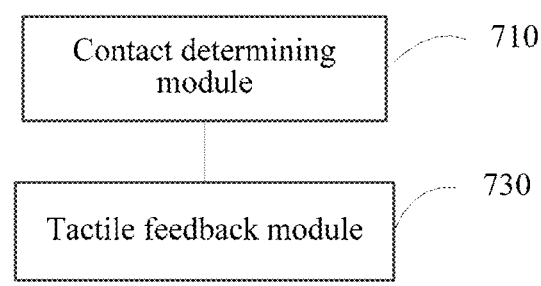
FIG. 7 is a schematic structural diagram of modules of a tactile feedback apparatus of an embodiment of the present application.

FIG. 7 is a schematic structural diagram of modules of a tactile feedback apparatus of an embodiment of the present application. The tactile feedback apparatus may be an independent physical device or may be one or more chips, a part of a circuit, or one or more functional modules in a VR interactive controller. As shown in FIG. 7, the tactile feedback apparatus may comprise:

a contact determining module 710, configured to determine, on a virtual reality (VR) interactive controller, a region where contact between a user and the VR interactive controller occurs; and a tactile feedback module 730, configured to generate, according to relevant information of an object simulated by the VR interactive controller, at least a first contact feedback in the region where the contact occurs.

The tactile feedback apparatus of the embodiments of the present application is used, wherein at least a first contact feedback is generated, according to relevant information of an object simulated by the VR interactive controller, in a region where contact between a user and the VR interactive controller occurs. Therefore, it is unnecessary to provide a tactile feedback to a user on the entire VR interactive controller, thereby greatly reducing energy consumption needed for generating a tactile feedback.

Figure 8:
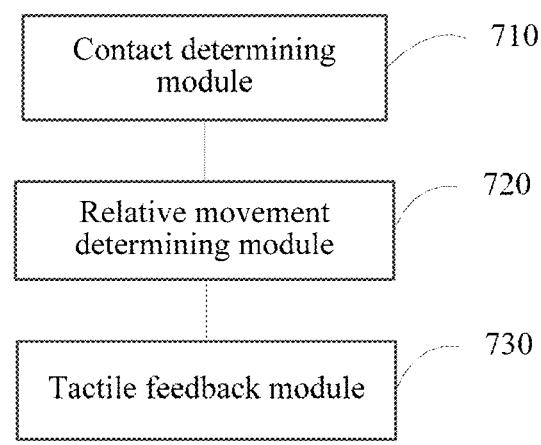
FIG. 8 is a schematic structural diagram of modules of a tactile feedback apparatus of another embodiment of the present application.

Optionally, as shown in FIG. 8, in an optional implementation manner, the tactile feedback apparatus 700 may further comprise:

a relative movement determining module 720, configured to determine a region where a relative movement between a grip portion of the user and the VR interactive controller occurs in the region where the contact occurs.

Figure 9:
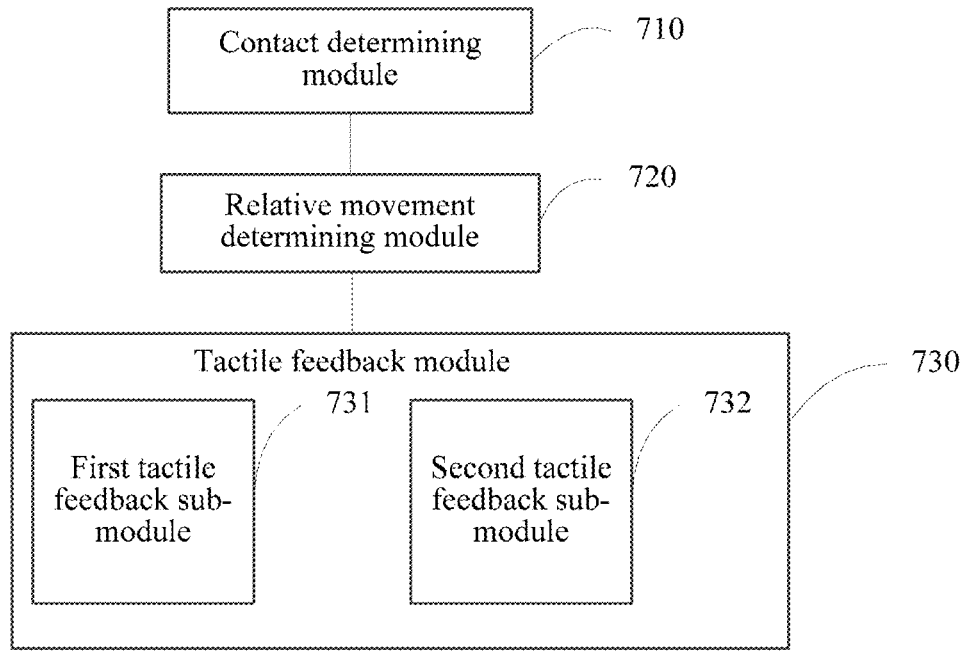
FIG. 9 is a schematic structural diagram of modules of a tactile feedback apparatus of another embodiment of the present application.

Optionally, as shown in FIG. 9, in an optional implementation manner, the tactile feedback module 730 may comprise:

a first tactile feedback sub-module 731, configured to generate, according to the relevant information of the object simulated by the VR interactive controller, the first tactile feedback in the part, other than the region where the relative movement occurs, of the region where the contact occurs;

a second tactile feedback sub-module 732, configured to generate, according to the relevant information of the object simulated by the VR interactive controller and a relevant parameter of the relative movement, a second tactile feedback in the region where the relative movement occurs, wherein: the second tactile feedback comprises the first tactile feedback and an elastic force feedback.

Figure 10:
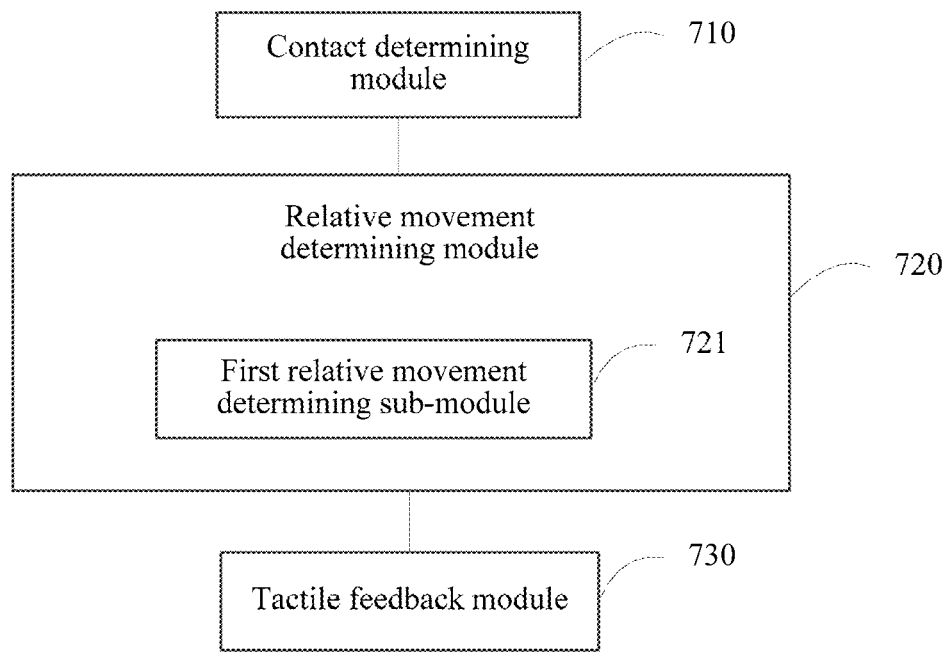
FIG. 10 is a schematic structural diagram of modules of a tactile feedback apparatus of another embodiment of the present application.

Optionally, as shown in FIG. 10, in an optional implementation manner, the relative movement determining module 720 may comprise:

a first relative movement determining sub-module 721, configured to determine, according to a detection sensor distributed on a surface of the VR interactive controller, the region where the relative movement between the grip portion of the user and the VR interactive controller occurs in the region where the contact occurs.

Figure 11:
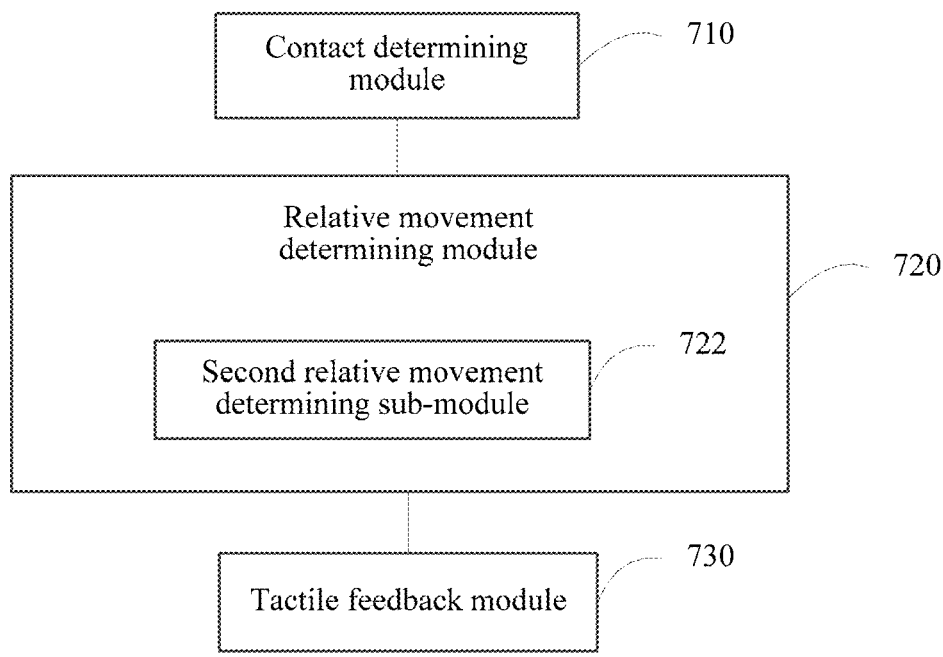
FIG. 11 is a schematic structural diagram of modules of a tactile feedback apparatus of another embodiment of the present application.

Optionally, as shown in FIG. 11, in an optional implementation manner, the relative movement determining module 720 may comprise:

a second relative movement determining sub-module 722, configured to determine, according to the object simulated by the VR interactive controller, the region where the relative movement between the grip portion of the user and the VR interactive controller occurs in the region where the contact occurs.

Figure 12:
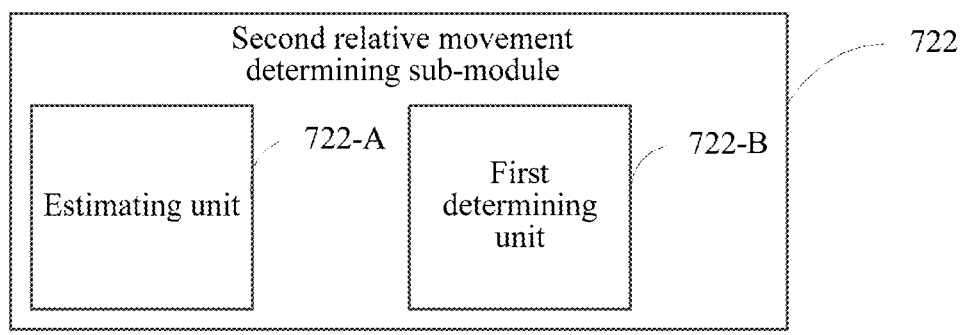
FIG. 12 is a schematic structural diagram of a second relative movement determining sub-module 722 of an embodiment of the present application.

In a specific implementation, as shown in FIG. 12, the second relative movement determining sub-module 722 may comprise:

an estimating unit 722-A, configured to determine, according to the object simulated by the VR interactive controller and an ongoing virtual content plot, an action to be performed by the grip portion of the user after a preset time period; and a first determining unit 722-B, configured to determine, according to the action to be performed by the grip portion of the user after the preset time period, the region where the relative movement between the grip portion of the user and the VR interactive controller occurs in the region where the contact occurs after the preset time period has passed.

Figure 13:
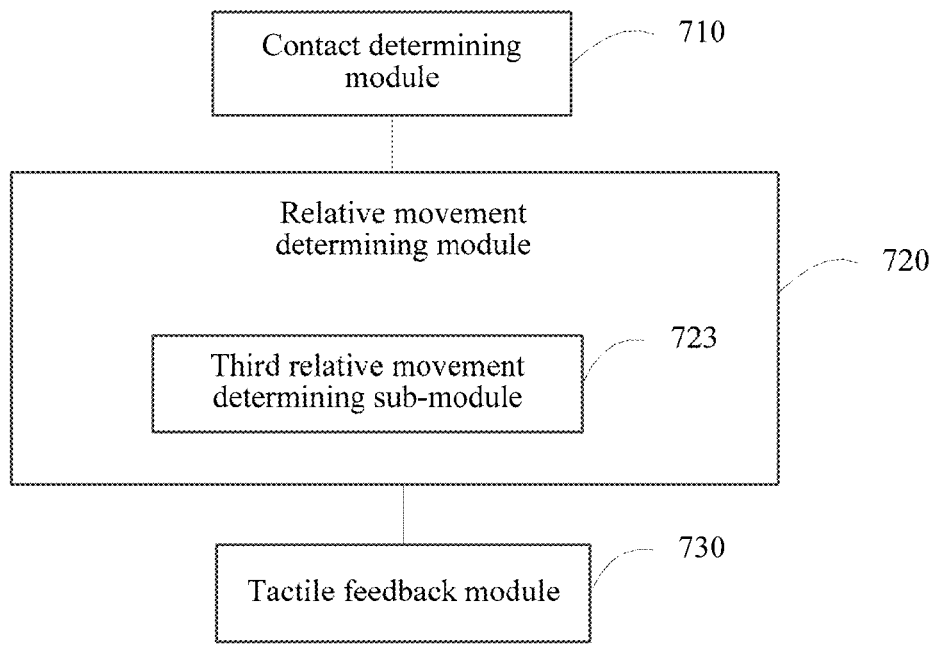
FIG. 13 is a schematic structural diagram of modules of a tactile feedback apparatus of another embodiment of the present application.

Optionally, as shown in FIG. 13, in an optional implementation manner, the relative movement determining module 720 may comprise:

a third relative movement determining sub-module 723, configured to determine, according to a change of the grip portion of the user acquired by at least one camera, the region where the relative movement between the grip portion of the user and the VR interactive controller occurs in the region where the contact occurs.

Figure 14:
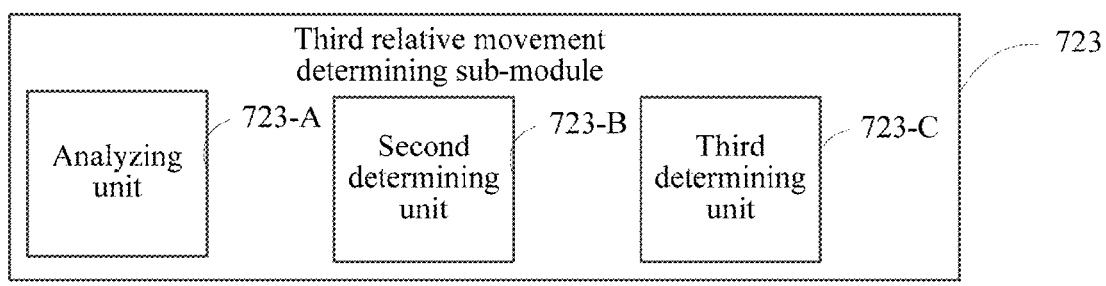
FIG. 14 is a schematic structural diagram of a third relative movement determining sub-module 723 of an embodiment of the present application.

In a specific implementation, as shown in FIG. 14, the third relative movement determining sub-module 723 may comprise:

an analyzing unit 723-A, configured to analyze a static picture or a moving image of the grip portion of the user collected by the at least one camera;

a second determining unit 723-B, configured to determine a change of a profile of the grip portion of the user; and a third determining unit 723-C, configured to determine, according to the change of the profile of the grip portion of the user, the region where the relative movement between the grip portion of the user and the VR interactive controller occurs in the region where the contact occurs.

Figure 15:
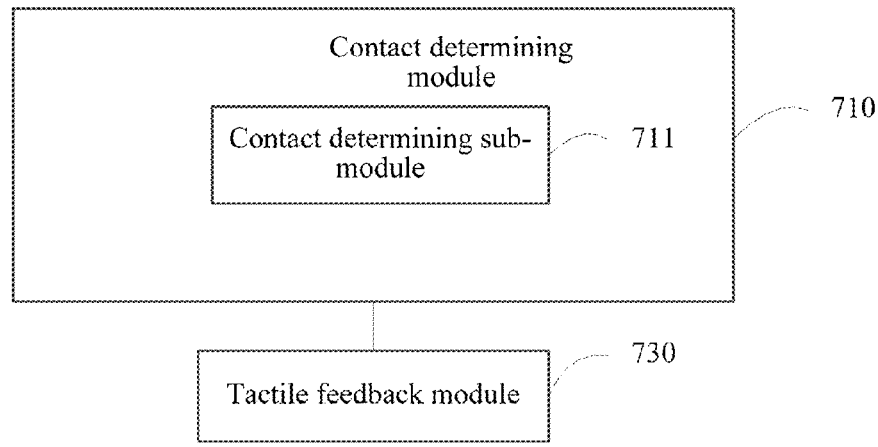
FIG. 15 is a schematic structural diagram of modules of a tactile feedback apparatus of another embodiment of the present application.

Optionally, as shown in FIG. 15, in an optional implementation manner, the contact determining module 710 may comprise:

a contact determining sub-module 711, configured to determine, according to a detection sensor distributed on a surface of the VR interactive controller, the region where the contact between the user and the VR interactive controller occurs on the virtual reality (VR) interactive controller.

Figure 16:
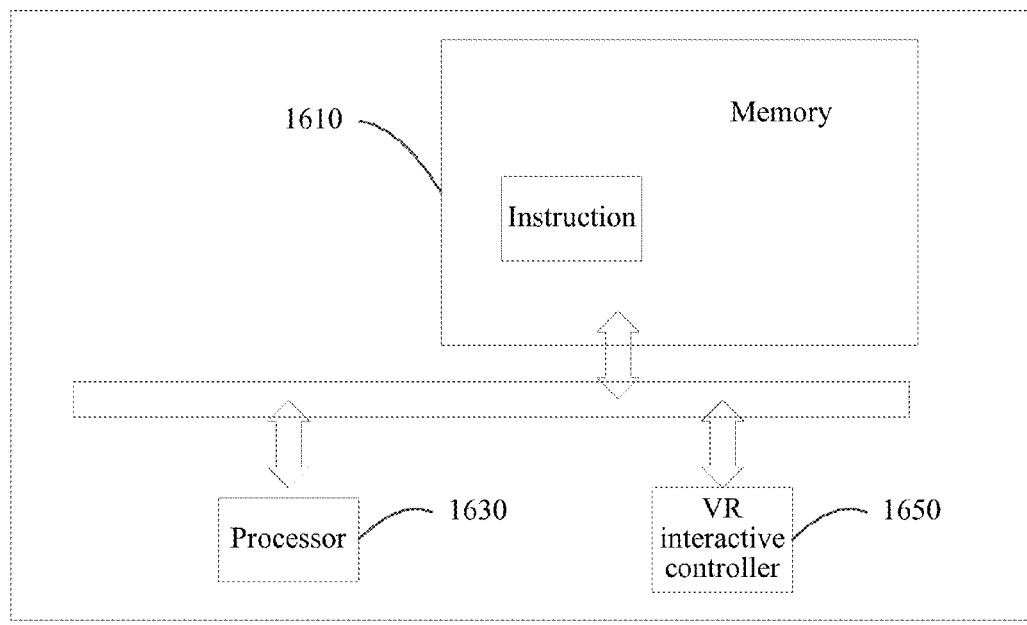
FIG. 16 is a schematic diagram of a VR interactive system provided by an embodiment of the present application.

FIG. 16 is a schematic diagram of a VR interactive system provided by another embodiment of the present application. Referring to FIG. 16, the VR interactive system may include:

a memory 1610, a processor 1630, and a VR interactive controller 1650, wherein the memory 1610 is configured to store an instruction; and the processor 1630 is configured to execute the instruction to execute the following steps:

determining, on the VR interactive controller 1650, a region where contact between a user and the VR interactive controller 1650 occurs; and generating, according to relevant information of an object simulated by the VR interactive controller 1650, at least a first contact feedback in the region where the contact occurs.

Preferably, the memory 1610 and/or the processor 1630 can be integrated on the VR interactive controller 1650.

It may be clearly understood by a person skilled in the art that, for the purpose of convenient and brief description, reference may be made to description of corresponding procedures of the tactile feedback method in the foregoing method embodiments for detailed working procedures of the foregoing tactile feedback apparatus and VR interactive system, and the details are not further described herein.

In conclusion, the VR interactive system of the embodiments of the present application is used, wherein at least a first contact feedback is generated, according to relevant information of an object simulated by the VR interactive controller, in a region where contact between a user and the VR interactive controller occurs. Therefore, it is unnecessary to provide a tactile feedback to a user on the entire VR interactive controller, thereby greatly reducing energy consumption needed for generating a tactile feedback.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a controller, or a network device) or a processor to perform all or a part of the steps of the methods in the embodiments of the present application. Moreover, the foregoing storage medium comprises: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A tactile feedback method, comprising:
   determining, on a virtual reality (VR) interactive controller, a region where contact between a user and the VR interactive controller occurs;
   generating, according to relevant information of an object simulated by the VR interactive controller, at least a first contact feedback in the region where the contact occurs,
   determining, according to an object simulated by the VR interactive controller and an ongoing virtual content plot, an action to be performed by a grip portion of the user after a preset time period; and
   determining, according to the action to be performed by the grip portion of the user after the preset time period, a region where a relative movement between the grip portion of the user and the VR interactive controller occurs in the region where the contact occurs after the preset time period has passed.

2. The method of claim 1, wherein the generating, according to relevant information of an object simulated by the VR interactive controller, at least a first contact feedback in the region where the contact occurs comprises:
   generating, according to the relevant information of the object simulated by the VR interactive controller, a first tactile feedback in the part, other than the region where the relative movement occurs, of the region where the contact occurs; and
   generating, according to the relevant information of the object simulated by the VR interactive controller and a relevant parameter of the relative movement, a second tactile feedback in the region where the relative movement occurs, wherein: the second tactile feedback comprises the first tactile feedback and an elastic force feedback.

3. The method of claim 1, wherein the determining a region where a relative movement between the grip portion of the user and the VR interactive controller occurs in the region where the contact occurs comprises:
   determining, according to a detection sensor distributed on a surface of the VR interactive controller, the region where the relative movement between the grip portion of the user and the VR interactive controller occurs in the region where the contact occurs.

4. The method of claim 1, wherein the determining a region where a relative movement between the grip portion of the user and the VR interactive controller occurs in the region where the contact occurs comprises:
   determining, according to the object simulated by the VR interactive controller, the region where the relative movement between the grip portion of the user and the VR interactive controller occurs in the region where the contact occurs.

5. The method of claim 1, wherein the determining a region where a relative movement between the grip portion of the user and the VR interactive controller occurs in the region where the contact occurs comprises:
   determining, according to a change of the grip portion of the user acquired by at least one camera, the region where the relative movement between the grip portion of the user and the VR interactive controller occurs in the region where the contact occurs.

6. The method of claim 5, wherein the determining, according to a change of the grip portion of the user acquired by at least one camera, the region where the relative movement between the grip portion of the user and the VR interactive controller occurs in the region where the contact occurs comprises:
   analyzing a static picture or a moving image of the grip portion of the user collected by the at least one camera;
   determining a change of a profile of the grip portion of the user; and
   determining, according to the change of the profile of the grip portion of the user, the region where the relative movement between the grip portion of the user and the VR interactive controller occurs in the region where the contact occurs.

7. The method of claim 1, wherein the determining, on a virtual reality (VR) interactive controller, a region where contact between a user and the VR interactive controller occurs comprises:
   determining, according to a detection sensor distributed on a surface of the VR interactive controller, the region where the contact between the user and the VR interactive controller occurs on the virtual reality (VR) interactive controller.

8. The method of claim 3, wherein the detection sensor distributed on the surface of the VR interactive controller comprises a pressure sensor.

9. The method of claim 1, wherein a first tactile feedback comprises:
   a physical material feedback of the object simulated by the VR interactive controller and/or a texture feedback of the object simulated by the VR interactive controller.

10. The method of claim 9, wherein the texture feedback comprises at least one of the following feedbacks:
    a concave-convex feeling feedback and a sticky feeling feedback.

* * * * *